(12) United States Patent
Kim

(10) Patent No.: US 8,573,658 B2
(45) Date of Patent: Nov. 5, 2013

(54) ACTIVE HOOD LATCH SYSTEM FOR VEHICLE

(75) Inventor: Dowon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 371 days.

(21) Appl. No.: 12/951,611

(22) Filed: Nov. 22, 2010

(65) Prior Publication Data

US 2012/0074715 A1  Mar. 29, 2012

(30) Foreign Application Priority Data

Sep. 28, 2010 (KR) ........................ 10-2010-0093525

(51) Int. Cl.
*E05C 3/06* (2006.01)

(52) U.S. Cl.
USPC ............ 292/201; 292/DIG. 23; 292/DIG. 65; 292/DIG. 14; 292/216

(58) Field of Classification Search
USPC .................. 292/201, 216, DIG. 23, DIG. 42, 292/DIG. 14, DIG. 65; 180/274
See application file for complete search history.

(56) References Cited

U.S. PATENT DOCUMENTS

| | | | |
|---|---|---|---|
| 4,974,885 A | | 12/1990 | Yokoyama |
| 5,348,355 A | * | 9/1994 | Oyha ............................... 292/11 |
| 6,106,033 A | * | 8/2000 | Ruckert ........................ 292/216 |
| 7,261,337 B2 | * | 8/2007 | Nakagome et al. ........... 292/216 |
| 7,559,399 B2 | * | 7/2009 | Lewis et al. .................... 180/274 |
| 2007/0246944 A1 | * | 10/2007 | Sundararajan et al. ......... 292/92 |

FOREIGN PATENT DOCUMENTS

| | | | |
|---|---|---|---|
| JP | 2002079906 A | * | 3/2002 |
| WO | WO 2004/074610 A1 | | 9/2004 |
| WO | WO 2004/110826 A1 | | 12/2004 |

\* cited by examiner

*Primary Examiner* — Carlos Lugo
*Assistant Examiner* — Mark Williams
(74) *Attorney, Agent, or Firm* — Morgan, Lewis & Bockius LLP

(57) ABSTRACT

An active hood latch system for a vehicle may include a housing, a locking/releasing bar connected to a cable of a hood latch assembly, a locking/releasing unit configured to release a locked state of the locking/releasing bar using a signal of a pedestrian collision detecting sensor, and a pulling unit configured to rotate the locking/releasing bar by pulling an end of the locking/releasing bar, wherein the hood latch assembly includes a main latch pivotally coupled to the housing, and a flexible member connecting the housing to the main latch, and wherein when the cable may be pulled by operating the locking/releasing unit using the signal of the pedestrian collision detecting sensor, the main latch may be released to pop up a hood and the flexible member connected to the main latch may be selectively extended by the hood to absorb collision energy and reduce damage to a pedestrian.

7 Claims, 4 Drawing Sheets

ACTIVE HOOD LATCH SYSTEM FOR VEHICLE

CROSS-REFERENCE TO RELATED APPLICATION

The present application claims priority to Korean Patent Application No. 10-2010-0093525 filed Sep. 28, 2010, the entire contents of which is incorporated herein for all purposes by this reference.

BACKGROUND OF THE INVENTION

1. Field of the Invention

The present disclosure relates to an active hood latch system for a vehicle. More particularly, it relates to an active hood latch system for a vehicle that enhances pedestrian protecting performance, thereby reducing damage to a pedestrian.

2. Description of Related Art

An engine hood for opening/closing an engine room is generally mounted to a vehicle such that it can be opened to repair parts installed within the engine room and to check general items if necessary. Accordingly, one side of the engine hood is hingedly coupled and connected to the chassis of the vehicle, and a hood latch assembly, i.e. a locking unit for an engine hood is mounted to the opposite side of the engine hood to selectively open the engine hood.

The hood latch assembly is a locking unit for opening/closing the engine hood and has a dual locking structure that not only prevents the engine hood from being opened but also maintains the closed state of the engine hood normally or during travel of the vehicle, and is installed at the chassis side at a lower portion of the tip end of the engine hood to seize or release a hood shaft mounted to an inner panel of the engine hood.

For example, in a locked state of the engine hood, the main latch of the hood latch assembly seizes the hood shaft, and if the hood shaft is released by the driver's releasing the main latch, it is loosened but is locked by a safety hook such that the engine cannot be fully opened.

Thus, only after the driver operates an opening lever in a determined direction, the engine hood can be completely opened.

Meanwhile, the lower body of a pedestrian is occasionally stricken while colliding with an upper leg foam region during collision of the vehicle and the pedestrian, and the Euro-NCAP is recently being carried out to discriminate the pedestrian protecting performance of a vehicle and a failing grade in protection of pedestrians is expected to increase from 2012.

Therefore, since the possibility of enacting a regulation for an upper leg foam region is high under enforcement of pedestrian protecting performance, it is necessary to enhance pedestrian protecting performance and reduce damage to pedestrians.

In order to enhance the current pedestrian protecting performance, there occur restrictions in designs as the height of the tip end of an engine hood is reduced to lessen striking energy and the parting line between the bumper and the hood has to be raised so that a pedestrian collides with a plastic portion at the initial stage. Meanwhile, since technologies for effectively reducing damage to pedestrians in an upper leg foam region without restriction to designs have not been sufficiently suggested, a measure to the pedestrian protection grade in designing an upper leg foam region is not sufficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide an active hood latch system that enhances pedestrian protecting performance by detecting collision of a pedestrian, primarily releasing a locked state of a hood latch assembly, and providing a damping effect due to a flexible member of the hood latch assembly to the pedestrian.

In an aspect of the present invention, the active hood latch system for a vehicle may include a housing, a locking/releasing bar connected to a cable of a hood latch assembly, a locking/releasing unit configured to release a locked state of the locking/releasing bar using a signal of a pedestrian collision detecting sensor, and a pulling unit configured to rotate the locking/releasing bar by pulling an end of the locking/releasing bar, wherein the hood latch assembly may include a main latch pivotally coupled to the housing, and a flexible member connecting the housing to the main latch, and wherein when the cable may be pulled by operating the locking/releasing unit using the signal of the pedestrian collision detecting sensor, the main latch may be released to pop up a hood and the flexible member connected to the main latch may be selectively extended by the hood to absorb collision energy and reduce damage to a pedestrian.

A sub-latch may be pivotally coupled to the housing and may include a holding protrusion to be selectively engaged to a holding notch of the main latch, wherein the flexible member may be extended by the main latch while the holding protrusion of the sub-latch may be engaged to the holding notch of the main latch, and when the cable may be pulled, the holding protrusion of the sub-latch may be disengaged from the holding notch of the main latch such that the flexible member rotates the main latch by resiliently restoring force thereof to release the locked state of the hood shaft.

A safety hook may be formed at an upper portion of the main latch with a predetermined space with the main latch to receive a hood shaft formed to the hood such that when the hood pops up, the hood shaft may be trapped in the predetermined space and reciprocates between the main latch and the safety hood.

The locking/releasing unit may include an intercepting bar configured to intercept rotation of the locking/releasing bar and a drive motor configured to move the intercepting bar so as to rotate the locking/releasing bar.

The pulling unit may be a tensile spring coupled to one side to the locking/releasing bar.

The cable may have an end pushed by rotation of the locking/releasing bar to pull the cable.

The flexible member may be extended to the main latch with it being extended, and when the cable may be pulled, the flexible member rotates the main latch by the resiliently restoring force to release the locked state of the hood shaft.

According to the present invention, an active hood latch system for a vehicle provides a cushion effect due to a tensile force of a spring of a hood latch assembly during collision of a pedestrian, reducing damage to the pedestrian, which is advantageous in layout without limiting conventional designs.

Furthermore, since pedestrian protecting performance is effectively enhanced, later enacted pedestrian protection regulations can be coped with.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
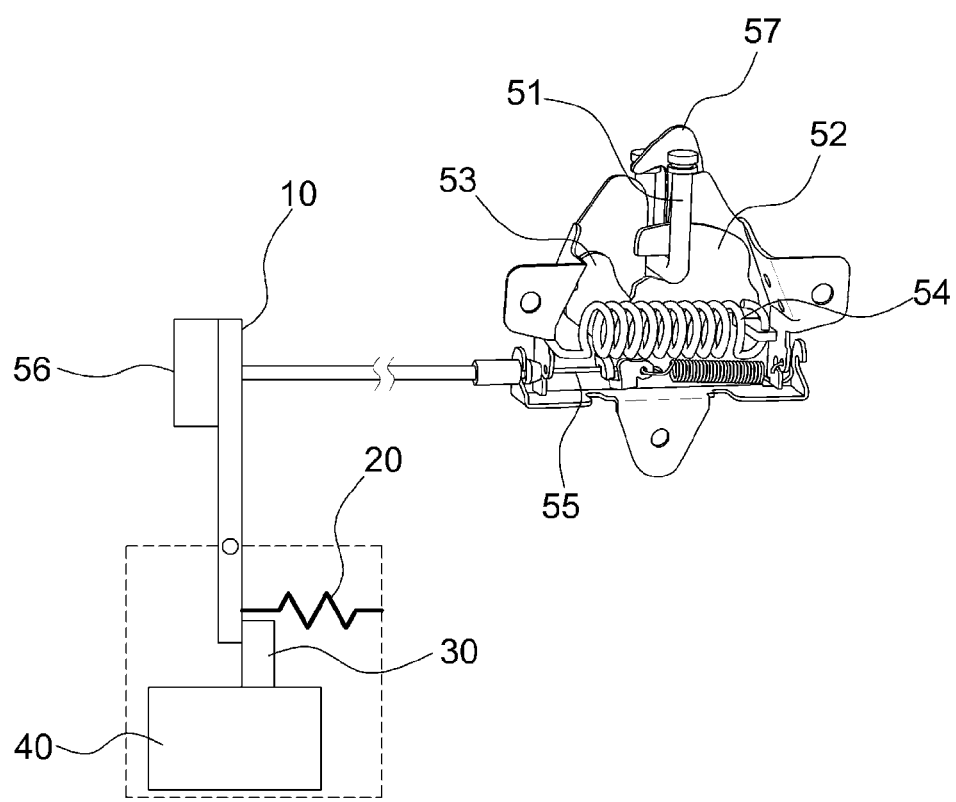
FIG. 1 is a schematic view illustrating an active hood latch system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms used hereinbelow are used to explain a specific embodiment of the present invention and are not intended to limit the scope of the present invention. In the description of the exemplary embodiment of the present invention, repeated explanation of the same parts as in a well-known technology is omitted.

Hereinafter, an exemplary embodiment of the present invention will be described below in detail with reference to the accompanying drawings such that those skilled in the art to which the present invention pertains can easily practice the present invention.

In the active hood latch system for a vehicle according to the exemplary embodiment of the present invention, a primary locking state of a hood shaft 51 is released (hood popped up) at the same time when a cable 55 of a hood latch assembly is pulled during collision of a pedestrian, such that a flexible member 54 connected to a main latch 52 of the hood latch assembly absorbs pedestrian collision energy and reduces damage to the pedestrian.

As illustrated in FIG. 1, the exemplary embodiment of the present invention includes a locking/releasing bar 10 connected to a cable 55 of the hood latch assembly, a pulling unit 20 for pulling and rotating an end of the locking/releasing bar 10, and a locking/releasing unit for locking and releasing the locking/releasing bar 10.

The locking/releasing bar 10 has a structure that can be rotated when pulled by the pulling unit 20, and is installed at or within the chassis.

The locking/releasing unit includes an intercepting bar 30 configured to intercept rotation of the locking/releasing bar 10 and a drive motor 40 for moving the intercepting bar 30 rearward to rotate the locking/releasing bar 10.

The hood latch assembly includes a sub-latch 53 connected to the cable 55, a main latch 52 caught and stopped by the sub-latch 53, and a flexible member 54 extendingly connected to one side of the main latch 52 and flexibly operated in association with rotation of the main latch 52.

That is, when the locking state of the main latch 52 is released by the sub-latch 53, the flexible member 54 rotates the main latch 52 in one direction. For example, the flexible member 54 may be a spring having a resiliently restoring force.

In the hood latch assembly, if the cable 55 is pulled, the sub-latch 53 pivotally coupled to a housing 28 is rotated to release the locking state of the main latch 52 and the primary locking state of a hood shaft 51 (a shaft of a striker installed on the rear surface of the hood panel) is released by the main latch 52 to pop up the hood while the main latch 52 is rotated by the resiliently restoring force of the flexible member 54.

The hood latch assembly includes the main latch 52 pivotally coupled to a housing 28 and configured to seize and primarily lock the hood shaft 51 and a safety hook 57 configured to seize and secondarily lock the hood shaft 51 when the primary locking sate of the hood shaft 51 is released by the main latch 52.

The cable 55 is connected to an end 56 contacting with an opposite end (the opposite side of the intercepting bar 30) of the locking/releasing bar 10.

The end 56 is pushed and moved by rotation of the locking/releasing bar 10 to pull the cable 55 to one side.

The pulling unit 20 may be formed of a tensile spring connected to and installed in an end of the locking/releasing bar 10 with it being extended, and rotates the locking/releasing bar 10 by pulling an end of the locking/releasing bar 10 at the same time when the locking state of the locking/releasing unit is released.

For example, with the tensile spring being extended, one side of the tensile spring is coupled to one end of the locking/releasing bar 10 and the opposite side thereof is coupled to a fixed portion such as the chassis or a mounting bracket.

That is, an end of the locking/releasing bar 10 is coupled to the pulling unit 20, and an end 56 of the cable 55 is connected to the opposite end of the locking/releasing bar 10 in conjunction with it.

Figure 3:
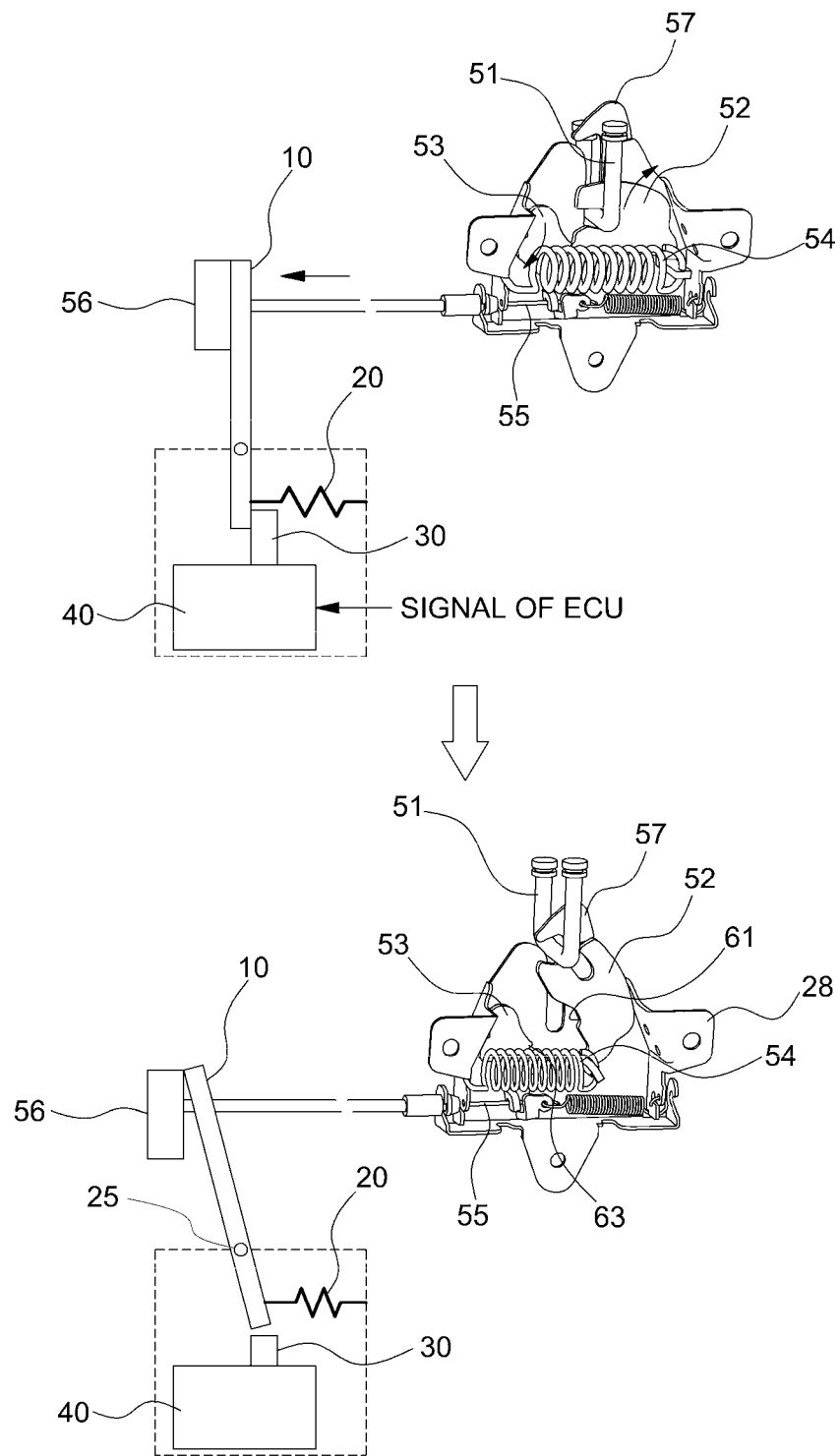

As the locking/releasing bar 10 is located perpendicular to the cable 55 by the intercepting bar 30 as in FIG. 1, the pulling unit 20 having a resiliently restoring force with it being extended, and an end of the locking/releasing bar 10 is pulled when interception of the intercepting bar 30 is released as in FIG. 3 and the locking/releasing bar 10 is rotated about a point (hinge point 25).

Meanwhile, the drive motor 40 of the locking/releasing unit is operated to move the intercepting bar 30 if an operation signal is transferred by an electronic control unit 1 installed at the front side of the vehicle.

The intercepting bar 30 extends to one end of the locking/releasing bar 10 to intercept rotation of the locking/releasing bar 10 with it being connected to the rotary shaft of the drive motor 40, and is moved rearward by the operation of the drive motor 40.

For example, during collision of a pedestrian, if a pedestrian collision detecting sensor 2 installed at the front side of the vehicle detects collision of the pedestrian and transmits a pedestrian collision signal to the ECU 1, the ECU 1 drives the drive motor 40.

Then, the intercepting bar 30 is moved rearward in a direction in which rotation of the locking/releasing bar 10 is not limited by the operation of the drive motor 40.

The rotary shaft of the drive motor 40 and the intercepting bar 30 have respectively spiral outer peripheral surfaces which contact with each other to be engaged with each other. Accordingly, if the rotary shaft is rotated by the operation of the drive motor 40, the intercepting bar 30 engaged with the rotary shaft is rotated to be far away from the locking/releasing bar 10, which is rotated without interception of the intercepting bar 30.

Hereinafter, the operation of the active hood latch system for a vehicle according to the exemplary embodiment of the present invention will be described.

Figure 2:
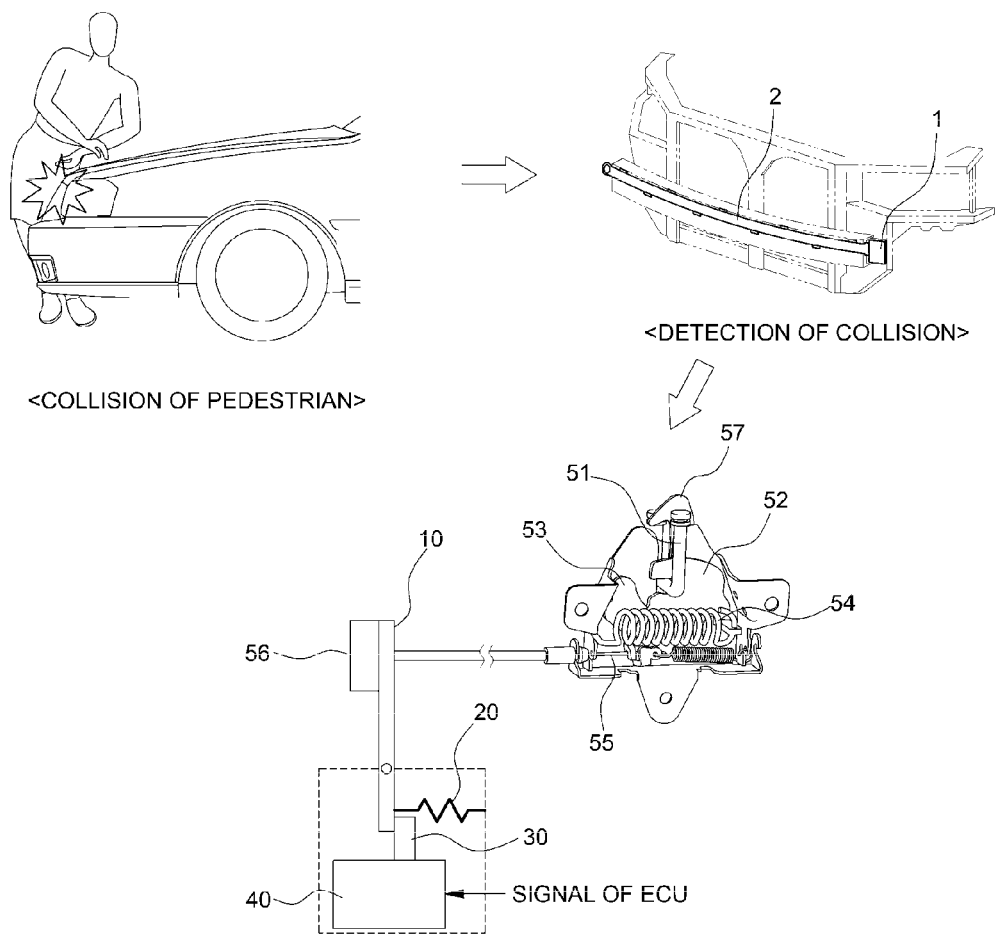
FIGS. 2 and 3 are views illustrating the operation of the active hood latch system for a vehicle according to the exemplary embodiment of the present invention.

As in FIG. 2, upon collision of a pedestrian, the pedestrian collision detecting sensor 2 detects collision of a pedestrian and transmits a pedestrian collision signal to the ECU 1.

The ECU which has received the pedestrian collision signal transmits an operation command signal to the drive motor 40 and the drive motor 40 moves the intercepting bar 30 to release the locking state of the locking/releasing bar 10.

An end of the locking/releasing bar 10 whose interception by the intercepting bar 30 is released is pulled by the resiliently restoring force of the pulling unit 20 and is rotated about one point, and the opposite end of the rotating locking/releasing bar 10 pushes the end 56 of the cable 55.

Then, the cable 55 is pulled to one side to rotate the sub-latch 53 in one direction, for example, in the clockwise direction. If the sub-latch 53 is rotated in the clockwise direction with respect to a pivotal point 72, a holding notch 61 of the main latch 52 caught by a holding protrusion 63 of the sub-latch 53 is released and is rotated in the clockwise direction with respect to a pivotal point 74, by the resiliently restoring force of the flexible member 54 to release the primarily locked state of the hood shaft 51.

Figure 4:
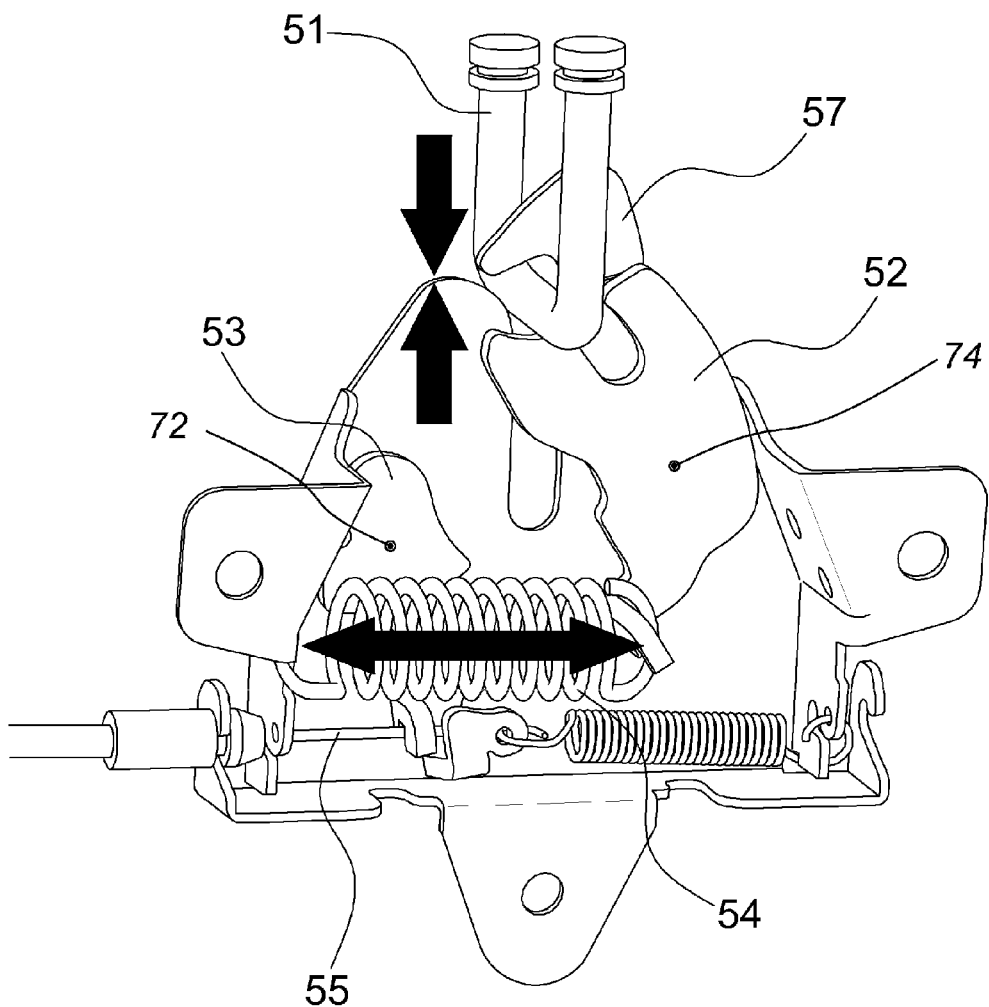
FIG. 4 is a schematic view illustrating the damping operation of the active hood latch system for a vehicle according to the exemplary embodiment of the present invention.

Accordingly, the engine hood is popped up, and as the engine hood is shaken by a collision impact of a pedestrian, the hood shaft 51 reciprocates between the safety hood 57 and the main latch 52 as in FIG. 4. Then, as the main latch 52 is rotated, a tensile force is applied to the flexible member 54 to obtain a damping effect, reducing an impact transferred to the pedestrian.

That is, if the main latch 52 is pushed by the hood shaft 51 as the engine hood is shaken, the flexible member 54 is extended. On the other hand, if the pushed state of the main latch 52 by the hood shaft 51 is released, the flexible member 54 is restored to obtain a cushion effect.

According to the active hood latch system for a vehicle of the present invention, pedestrian protecting performance (for example, performance in an upper leg foam region and a child head foam region), reducing damage to a pedestrian.

Further, according to an exemplary embodiment of the present invention, since pedestrian protecting performance is effectively enhanced, later enacted pedestrian protection regulations can be coped with.

Furthermore, according to an exemplary embodiment of the present invention, since it is unnecessary to reduce the height of the front of a hood and raise a bumper/hood, without limiting conventional designs, it is advantageous in layout.

In addition, since the active hood latch system according to an exemplary embodiment of the present invention uses a hood latch assembly basically installed in a vehicle, a separate actuator is not required. Further, since the mechanism except for the locking/releasing unit is the same, system safety and operation reliability are enhanced and For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active hood latch system for a vehicle, the active hood latch system comprising:
    a housing;
    a locking/releasing bar connected to a cable of a hood latch assembly;
    a locking/releasing unit configured to release a locked state of the locking/releasing bar using a signal of a pedestrian collision detecting sensor; and
    a pulling unit configured to rotate the locking/releasing bar by pulling an end of the locking/releasing bar,
    wherein the hood latch assembly includes:
        a main latch pivotally coupled to the housing; and
        a flexible member connecting the housing to the main latch;
    wherein when the cable is pulled by operating the locking/releasing unit using the signal of the pedestrian collision detecting sensor, the main latch is released to pop up a hood and the flexible member connected to the main latch is selectively extended by the hood to absorb collision energy and reduce damage to a pedestrian; and
    wherein a safety hook is formed at an upper portion of the main latch with a predetermined space with the main latch to receive a hood shaft formed to the hood such that when the hood pops up, the hood shaft is trapped in the predetermined space and reciprocates between the main latch and the safety hood while the hood shaft is continuously engaged with the main latch.

2. The active hood latch system of claim 1, wherein a sub-latch is pivotally coupled to the housing and includes a holding protrusion to be selectively engaged to a holding notch of the main latch.

3. The active hood latch system of claim 2, wherein the flexible member is extended by the main latch while the holding protrusion of the sub-latch is engaged to the holding notch of the main latch, and when the cable is pulled, the holding protrusion of the sub-latch is disengaged from the holding notch of the main latch such that the flexible member rotates the main latch by resiliently restoring force thereof to release the locked state of the hood shaft.

4. The active hood latch system of claim 1, wherein the locking/releasing unit includes an intercepting bar configured to intercept rotation of the locking/releasing bar and a drive motor configured to move the intercepting bar so as to rotate the locking/releasing bar.

5. The active hood latch system of claim 1, wherein the pulling unit is a tensile spring coupled to one side to the locking/releasing bar.

6. The active hood latch system of claim 1, wherein the cable has an end pushed by rotation of the locking/releasing bar to pull the cable.

7. The active hood latch system of claim 1, wherein the flexible member is extended with a rotation of the main latch and then the main latch is locked, and when the cable is pulled, the main latch is unlocked and the flexible member rotates the main latch by the resiliently restoring force to release the locked state of the hood shaft.

* * * * *